United States Patent [19]

Petrella

[11] 4,199,341
[45] Apr. 22, 1980

[54] GLASS LIFT MECHANISM FOR AND METHOD OF PRESS BENDING GLASS SHEETS

[75] Inventor: Joseph R. Petrella, Culver City, Calif.

[73] Assignee: PPG Industries, Inc., Pittsburgh, Pa.

[21] Appl. No.: 942,207

[22] Filed: Sep. 14, 1978

[51] Int. Cl.² ............................................. C03B 23/02
[52] U.S. Cl. ....................................... 65/104; 65/106; 65/268; 65/273; 65/275
[58] Field of Search ............... 65/104, 106, 268, 273, 65/275

[56] References Cited

U.S. PATENT DOCUMENTS

| | | | |
|---|---|---|---|
| 3,341,312 | 9/1967 | Wheeler et al. | 65/25 A |
| 3,341,313 | 9/1967 | Wheeler et al. | 65/104 |
| 3,450,517 | 6/1969 | Richardson | 65/273 X |
| 3,477,840 | 11/1969 | Oelke et al. | 65/287 |
| 3,536,464 | 10/1970 | Seymour | 65/104 |
| 3,595,636 | 7/1971 | Posney | 65/287 |
| 3,630,706 | 12/1971 | Oelke et al. | 65/104 |
| 3,737,297 | 6/1973 | Frank | 65/104 X |
| 3,834,885 | 9/1974 | Frank | 65/273 X |
| 3,854,920 | 12/1974 | Kay et al. | 65/106 |
| 3,870,500 | 3/1975 | Jack et al. | 65/273 |

Primary Examiner—Arthur D. Kellogg
Attorney, Agent, or Firm—Dennis G. Millman; Edward I. Mates

[57] ABSTRACT

This invention relates to the handling of glass sheets that are supported by a conveyor along their bottom edges and balanced in an upright position for movement through a furnace, a shaping station and a cooling area. Means are provided to temporarily lift the glass sheet so that its entire extent is aligned with the facing shaping surfaces of a pair of shaping molds during shaping and returned to the bottom edge supporting conveyor which conveys the shaped glass sheet into the cooling area after it is shaped. Such treatment improves the contour of the bottom edge of the shaped glass sheet.

6 Claims, 9 Drawing Figures

GLASS LIFT MECHANISM FOR AND METHOD OF PRESS BENDING GLASS SHEETS

BACKGROUND OF THE INVENTION

1. Field of the Invention

This invention relates to the shaping and cooling of glass sheets and particularly to the high speed production of bent glass sheets that are toughened by air quenching, and most particularly, for shaping and heat treating relatively thin glass sheets.

Shaped glass sheets are widely used as side windows, bent panes and rear quarter lights in vehicles such as automobiles or the like. To be suitable for such application, flat glass sheets must be shaped to precisely the fine curvatures dictated by the shape and outline of the frames defining the window openings into which the glass articles are installed. It is also important that the articles in vehicles meet stringent optical requirements and that the windows be free of optical defects that would tend to interfere with a clear viewing therethrough in their viewing area.

During fabrication, glass sheets intended for use as shaped windows in vehicles are subjected to thermal treatment to temper the glass for strengthening the same and increasing the resistance of the shaped window to damage resulting from impact. In addition to increasing the resistance of the glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat glass sheets to the softening point of the glass, shaping the heated sheet to a desired curvature, and then cooling the bent sheets in a controlled manner to a temperature below the annealing range of the glass. During such treatment, a glass sheet is conveyed as one of a series of sheets along a substantially horizontal path that extends through a tunnel-type furnace, a shaping station and a cooling area.

In the furnace, the glass sheets are heated to the deformation temperature of glass. At the shaping station, each glass sheet in turn is brought into alignment between a pair of retracted shaping molds of complementary shape. The molds move toward one another to sandwich the glass sheet therebetween to impart their shape thereto and then retract. The glass sheets are then transferred into the cooling area where tempering medium, usually blasts of air, are imparted against the opposite surfaces of the shaped glass sheet to impart at least a partial temper to the glass. The rate of cooling the hot glass through its annealing range determines how much the glass is tempered.

When glass sheets are gripped near their upper edges by tongs for handling during such treatment, the tongs tend to penetrate and deform the upper portions of the glass sheet in the vicinity of the tong gripping points. This deformation becomes more critical in dealing with thinner glass sheets. Furthermore, the time spent from the end of the heating step to the beginning of the rapid cooling step needed for tempering glass sheets must be minimized, particularly in the case of thin glass sheets having a thickness of 4 millimeters and less as compared with prior art thicknesses of 4.5 millimeters and more, because there is less residual heat in thinner glass sheets so that thin glass sheets tend to cool more rapidly than thicker sheets to below a temperature at which a temper can be induced in the glass on sudden chilling.

Glass sheets have been tempered and have been shaped and tempered by the so-called vertical air wall technique in which the glass sheets are moved in a series of glass sheets through a furnace of tunnel-type configuration, then into a shaping station and finally into a cooling area while each glass sheet is supported in balanced relation in an upright position by flows of hot gas that provide both glass sheet support and conductive and radiant heat. The heat may be supplemented by additional radiation heat sources. Flows of gas may be applied against the bottom surface of the glass sheets to support the glass sheets obliquely to a vertical or horizontal position on the gaseous support. For the purpose of this specification, the term "upright support" encompasses any orientation that is neither horizontal nor nearly horizontal.

Such support for the glass sheets by a gaseous bed avoids the marks that result from using tongs to suspend the hot glass sheets. However, the glass sheet must be supported somehow along its bottom edge both before and after it is shaped by mold engagement. In the past, in order to allow the molds to move toward the aligned glass sheet and to retract, it was necessary to support the lower edge of the glass sheet below the bottom edge of the molds of complementary curvature that engage the opposite glass sheet surfaces. Therefore, the lower edge portion of the glass sheet was never engaged between the molds. Such incomplete engagement of the glass sheet above its lower edge left the shaped glass sheet with a bottom edge portion that did not conform within the precise tolerances necessary for shaped glass sheets to produce a precise fit within the frame of a vehicle in which it is to be installed.

2. The Prior Art

U.S. Pat. Nos. 3,341,312 and 3,341,313 to Robert W. Wheeler and Charles R. Davidson, Jr., both provide apparatus that convey glass sheets in succession through a tunnel-like furnace while heated and balanced by either flows of hot gases or a combination of hot gases and radiant heating while the bottom edges are supported on a series of circumferentially grooved rolls that propel the glass through the various treatment stations.

Each glass sheet, on arrival at a shaping station between a pair of complementary press bending molds, is engaged between the press bending molds for sufficient time for the molds to impress their complementary shapes on the heat softened glass. Then, the molds are retracted and the bent glass begins to move toward a cooling area where its opposite surfaces are chilled as rapidly as possible to impart at least a partial temper to the glass.

U.S. Pat. No. 3,450,517 to Ronald E. Richardson discloses a method and apparatus to reduce damage to press bent glass sheets due to tong pull during press bending. A carriage from which a set of glass gripping tongs is suspended is raised a short distance immediately before a pair of press bending molds engage the glass sheet, then the carriage is lowered to its initial position while the molds engage the glass to relax the tongs. After shaping is completed, the molds retract to permit the shaped glass sheet to hang once more from said tongs. While this invention reduces the severity of defects due to tong pull, it still fails to provide complete elimination of tong marks.

U.S. Pat. No. 3,477,840 to Waldemar W. Oelke, Frank J. Carson, Alfred E. Badger and Thomas B. O'Connell uses a notched guide bar to help support glass sheets of triangular configuration which are balanced in oblique dispositions between a pair of gaseous beds. The notch permits the top triangular edge of a glass sheet to move into a position where it can be in alignment between a pair of press bending molds that shape the triangular shaped glass sheet to its desired curvature.

U.S. Pat. No. 3,595,636 to Richard V. Posney discloses complementary press bending molds having grooved press faces provided with apertures to supply heated gas and/or cool gas at the time that glass sheets are engaged between the molds for shaping. The glass sheets in this patent are gripped by tongs for support from carriages that move through a furnace, into the press bending station and subsequently into a cooling area.

U.S. Pat. No. 3,630,706 to Waldemar W. Oelke, Frank J. Carson, and Alfred E. Badger discloses apparatus for supporting glass sheets along their lower edges for movement in an oblique plane of support through a heating furnace, into a shaping station and then through a cooling area. This patent uses conveyor belts to support the bottom edge of the glass sheet while it is engaged between shaping members.

U.S. Pat. Nos. 3,737,297 and 3,834,885 to Robert G. Frank disclose apparatus that conveys glass sheets while supported along its bottom edge by a series of conveyor belts through a furnace, a movable shaping station, and a cooling area. The movable glass shaping apparatus is designed to simultaneously transport the glass from a furnace exit to a cooling area spaced therefrom while it is being shaped. It is necessary to return the glass shaping apparatus to the vicinity of the exit of the furnace in order to pick up the next glass sheet being produced in order to provide a mass production operation involving a series of glass sheets.

U.S. Pat. No. 3,854,920 to Solomon E. Kay and John Pickard discloses apparatus for shaping glass sheets by the press bending method involving a pair of molds that are heated in such a manner that the mold and glass sheet temperature is substantially uniform at the end of a press bending operation. The glass sheets in this apparatus are suspended from tongs.

In all of the prior art patents enumerated above, the glass sheets undergoing press bending are either engaged by tongs that clamp against the upper edge portion of the glass to impart local deviations from desired curvature or the glass sheets are supported along their edge below the lower edge of the press bending molds during shaping. In the latter case, the bottom edge of the shaped glass sheet fails to conform to the shaped desired because prior art shaping molds never engaged the bottom edge portions of glass sheets.

SUMMARY OF THE PRESENT INVENTION

The present invention provides in combination with shaping molds of complementary curvature, means for supporting glass sheets along their lower edge in combination with means that temporarily lift the glass when the glass is aligned between a pair of press bending molds so that the entire extent of the glass including its lower edge is shaped to the desired shape by sandwiching between the pair of shaping molds. When the molds are retracted, the glass sheets are redeposited on the bottom edge supporting means which convey the glass from the shaping station to a cooling area where the shaped glass sheets are cooled sufficiently rapidly to impart a desired degree of temper. These and other benefits of the present invention will become obvious in the light of a description of an embodiment thereof which follows.

BRIEF DESCRIPTION OF THE DRAWINGS

In the drawings that form part of a description of an illustrative embodiment of the present invention and wherein like reference numbers are applied to like structural elements.

DESCRIPTION OF A PREFERRED EMBODIMENT

Figure 1:
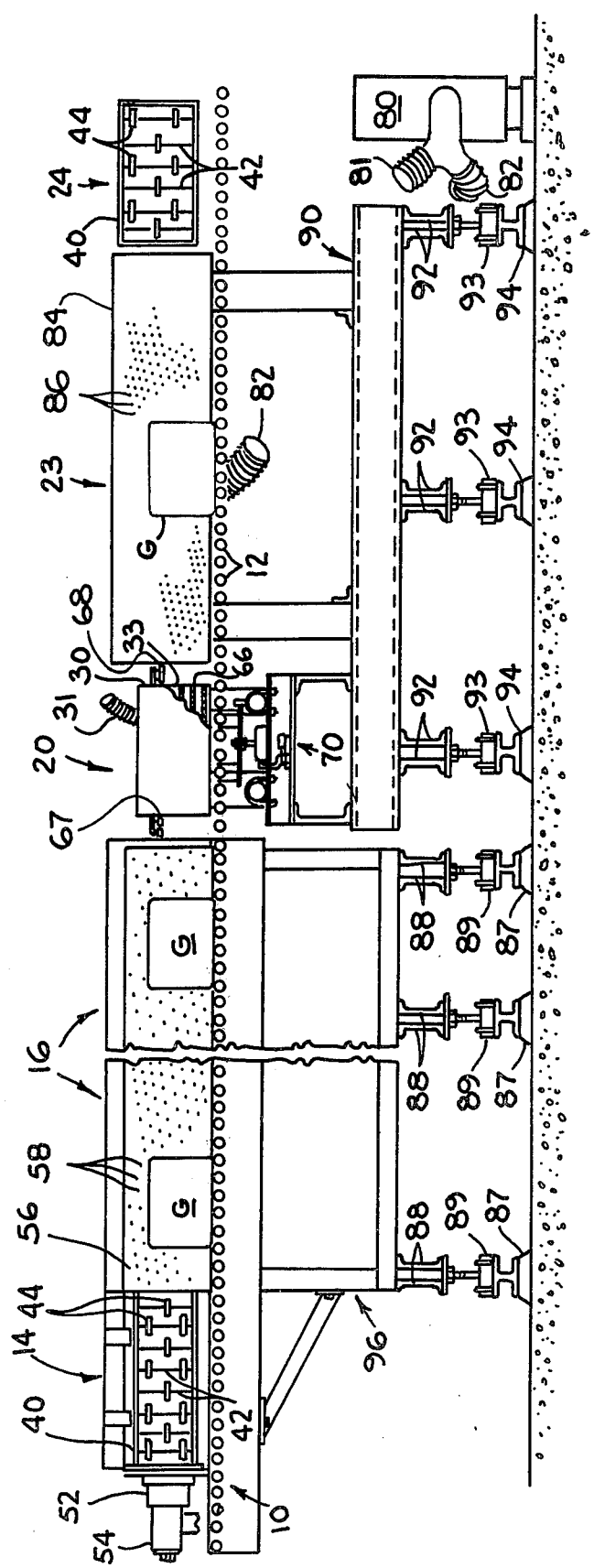
FIG. 1 is a longitudinal sectional view of apparatus for heating, shaping and tempering glass sheets that comprises a glass sheet shaping station modified according to the present invention.
Figure 2:
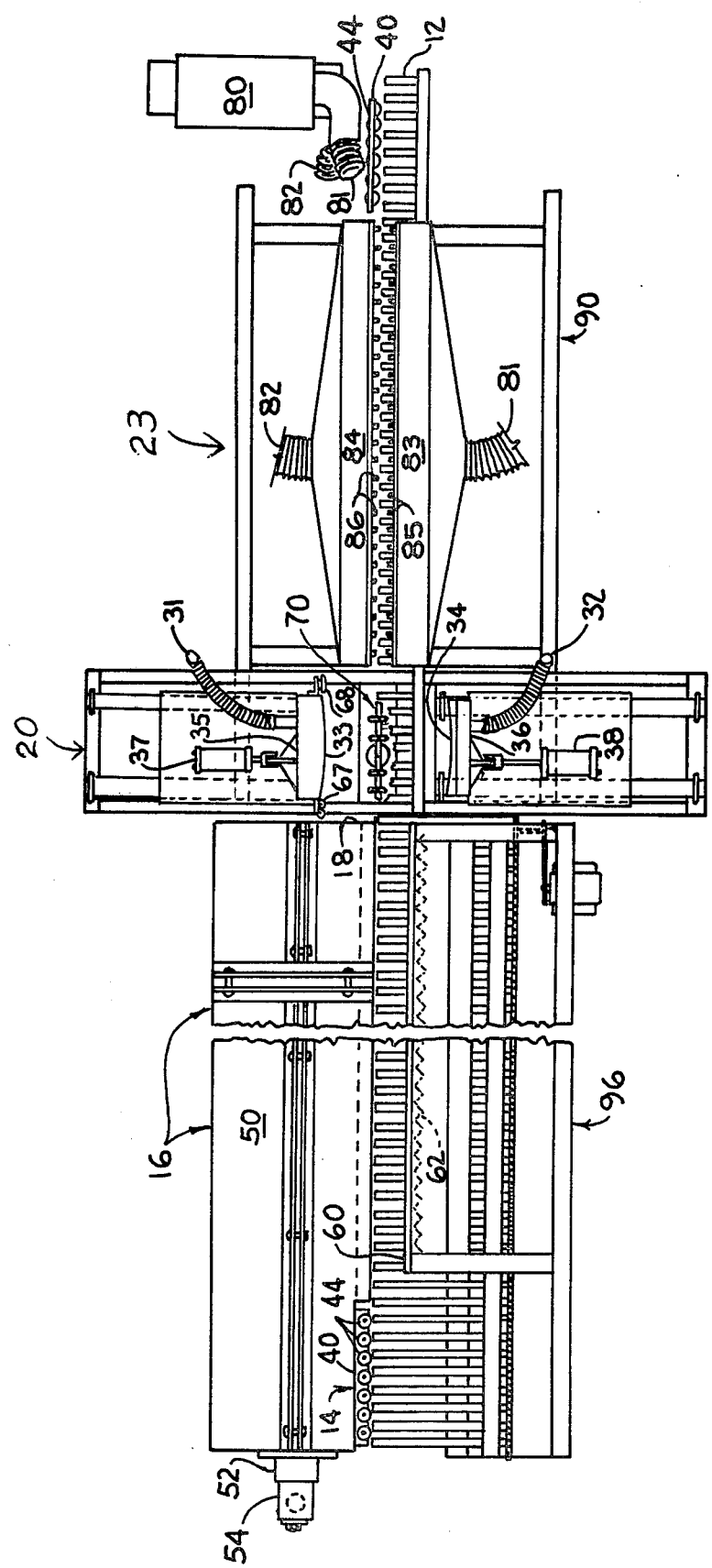
FIG. 2 is a plan view of the apparatus of FIG. 1.

Referring to the drawings, and particularly FIGS. 1 and 2, an illustrative embodiment of the present invention is shown comprising a conveyor 10 which includes a plurality of longitudinally spaced conveyor rolls 12. The conveyor 10 begins adjacent a loading station 14 and extends through a tunnel-like furnace 16 and beyond the exit end 18 of the furnace through a shaping station 20, a cooling station 23 and terminates in an unloading station 24. The conveyor 10 provides a predetermined path of movement that extends through the furnace 14, the shaping station 20 and the cooling area 23.

The conveyor 10 is sectionalized so that different sections of conveyor rolls 12 can be selectively driven at different speeds or even stopped altogether while other sections are continuing to operate. This feature is well known in the art of treating glass sheets and a specific description of this feature would merely enlarge the present disclosure. Suffice it to say that the sectionalizing of the conveyor may be done by operating each section by a clutch that operates independently of the clutches that engage the conveyor rolls of other sections. Alternately, different motor drives can be used to control the operation of each conveyor section individually. Furthermore, while the entire length of conveyor 10 is shown comprising rolls 12, spaced conveyor rolls are only required at the shaping station 20. Belts may be substituted to engage the bottom end of glass sheets elsewhere along the predetermined path of travel.

The furnace 16, the press bending or shaping station 20 and the cooling station 23 are depicted in vertical orientation in FIGS. 1 and 2 to facilitate the illustration of the preferred embodiment of the present invention. In actual operation, however, the entire apparatus is usually oriented at a slight oblique angle to the vertical as shown in FIGS. 4 to 9. However, the apparatus can also operate with the glass sheet supported in a vertical orientation.

The loading and unloading stations are substantially identical, each comprising a frame 40, which supports a series of axles 42, each of which carry free-running rollers 44. The bottom edge of glass sheets are mounted in an oblique orientation with their lower major surfaces supported on the free-running rollers 44 and their bottom edges supported on the conveyor rolls 22.

The unloading station 24 is similar in construction to the loading station 14 and also comprises a frame 40 supporting free-running rollers 44 mounted on similar axles 42. The frames 40 are oriented in an oblique plane, with the frame for the unloading station 24 disposed adjacent the upper tangent of the conveyor rolls 12 to enable the rollers 44 of the second frame 40 to provide rolling engagement for the bottom major surface of the glass sheet whose lower edge is supported on the conveyor rolls 12 that extend through the unloading station 24.

The furnace 16 comprises a gas plenum chamber 50 which serves as a reservoir of hot gases. The gas is provided by a gas burner 52 and a fan 54 which blows the hot gases through the gas plenum chamber 50 along the entire length of the furnace 16. The gas plenum chamber 50 has an inward facing, longitudinally extending apertured wall 56 disposed to one side of a plane of support provided by the conveyor rolls 12. Thus, hot gas blown through the gas plenum chamber 50 is forced out through an array of openings 58 in the apertured wall to form a gas support bed for glass sheets G conveyed through the furnace. The opposite wall of the furnace 60 supports sets of electrical heating elements 62 which radiate heat onto the upper surface of the glass sheets opposite the major surface exposed to the blasts of hot gas discharged through the apertures 58. Electrical energy is supplied to the electrical heating elements in such a manner as to provide a desired heating pattern extending longitudinally and transversely of the path of movement of glass sheets through the furnace 16 defined by the conveyor rolls 12.

The apertures 58 in the apertured wall 56 of the furnace 16 are disposed in oblique rows and the particular arrangement of the rows, the size and space between adjacent openings and the amount of hot gas provided through the burner 52 and the blower or fan 54 can be adjusted as desired to ensure that glass sheets being processed are supported in balanced condition. It is preferred, however, to establish a given set of conditions so that whenever it is necessary to change production from glass sheets of one thickness to glass sheets of another thickness, the angle at which the furnace 16 and the other pivotable superstructure is oriented relative to base members on which it is mounted can be readily adjusted, as described and claimed in U.S. Pat. No. 3,737,297 to Robert G. Frank.

The shaping station 20 is preferably of the type depicted in U.S. Pat. No. 3,595,636 to Richard V. Posney. The shaping station comprises a first shaping mold 33 having a shaping surface of convex contour opposed by a second shaping mold 34 having a complementary shaping surface of concave contour. The molds are attached to reinforcing brackets 35 and 36 respectively. The brackets are attached to pistons 37 and 38 to move the molds between a glass-engaging state and a retracted state.

The reinforcing brackets 35 and 36 form the rear walls of a chamber for the respective shaping molds 33 and 34. These chambers receive hot air under pressure through flexible supply hoses 31 and 32 respectively. The shaping molds 33 and 34 are provided with suitable covers 30 of fiber glass. Preferably, the covers are formed of knit fiber glass comprised of textured yarn of the type depicted in U.S. Pat. No. 3,148,968 to James H. Cypher and Clement E. Valchar. The covers are secured over the shaping faces of the shaping molds 33 and 34. The latter are preferably of a material that does not react chemically with glass, that is easily shaped and formed to have a smoothly surfaced contour, that has good durability despite intermittent contact with hot glass that causes rapid cyclic temperature variations over an extended period of use during operation and that has no chemical reaction with hot gases that are passed through apertures formed in grooves provided on the glass sheet facing surfaces of the molds. A good material for the grooved apertured shaping molds 33 and 34 is an alumino silica cement sold by Johns-Manville under the trademark of TRANSITE.

The convex shaping mold 33 provides a refractory convexly shaped front wall of a mold chamber formed in cooperation with the reinforcing bracket 35. Similarly, concave shaping mold 34 forms a refractory, concavely shaped front wall of a chamber in cooperation with the reinforcing bracket 36. The front walls of molds 33 and 34 are of complementary shape. The convex mold 33 and the concave shaping mold 34 have holes 64 drilled through the thickness thereof. The holes 64 are disposed along horizontally extending channels 66 that are grooved in the surfaces of the molds 33 and 34 that face the opposite surfaces of glass sheets G that are conveyed therebetween for shaping.

A pair of support rolls 67 is located between the exit 18 of the furnace 16 and the shaping station 20. Also, a support bar 68 is located between the shaping station 20 and the cooling station 23. The support roll 67 and support bar 68 are located in position to support the lower major surface of the glass sheet as the latter enters the shaping station 20 or leaves the shaping station, respectively.

Figure 3:
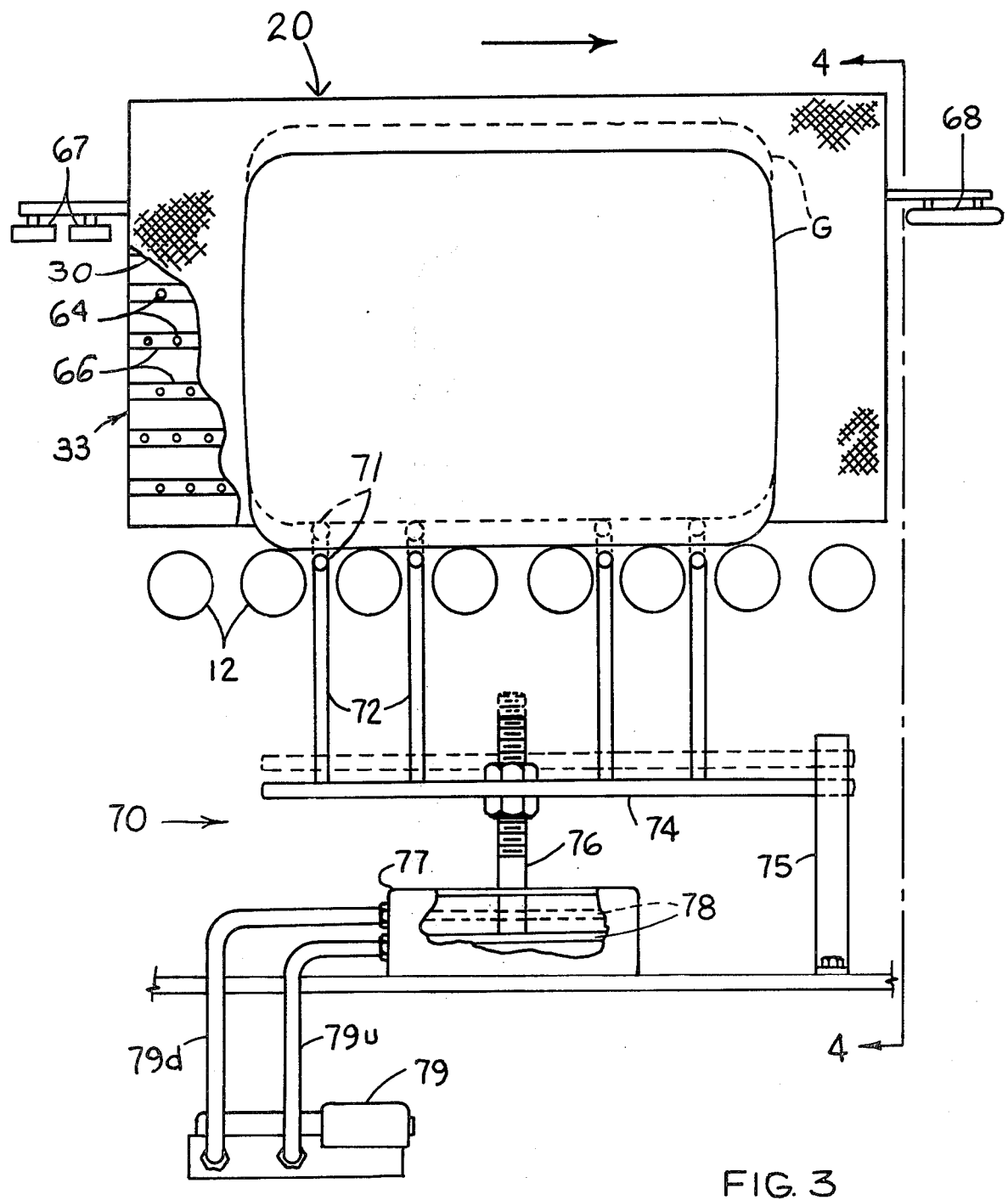
FIG. 3 is a fragmentary, enlarged longitudinal frontal view of one of a pair of complementary glass sheet shaping molds showing means for lifting a hot glass sheet off bottom edge conveyor support means in a retracted position below said bottom edge conveyor support means in solid lines and in glass lifting position above said bottom edge support means in phantom.

The gist of the present invention is glass sheet lifting means 70 located at the shaping station 20. The glass lifting means 70 comprises a plurality of transversely extending fingers 71, four of which are shown in the illustration although the number of fingers used may depend upon the length of glass sheet being processed. The fingers are shown in their raised position in phantom in FIG. 3. The transversely extending fingers are symmetrically connected to the upper ends of elongated fingers 72. The latter in turn are carried by a cross bar 74. The cross bar 74 has one end received between spaced guide bars 75 and is connected in spaced relation to said end to an externally threaded piston rod 76 of a pancake cylinder 77. A piston 78 for the piston cylinder 77 is shown in the broken away portion of the piston cylinder in its retracted position in solid lines and in its raised position in phantom. A solenoid valve 79 controls the flow of pressurized air through either flow line 79-u which causes the piston 78 to rise within piston cylinder 77 and pressurized air supply line 79-d which causes the piston 78 to be lowered within piston cylinder 77. Movement of the piston 78 controls the positioning of the transverse fingers 71 of the glass sheet lifting means 70 between a retracted position for the fingers which is just immediately below the common upper tangent for the conveyor rolls 12 that extends through the shaping station 20 and a raised position in which the fingers 71 are disposed slightly above the level of support provided by the common upper tangent of the conveyor rolls 12 for reasons to be stated later.

The cooling station 23 comprises an air blower 80 provided with conduit branches 81 and 82 which lead to a pair of opposed plenum chambers 83 and 84. As in typical glass cooling apparatus, the plenum chambers are provided with obliquely aligned rows and columns of nozzles 85 and 86 extending toward one another in spaced relation on opposite sides of the path of movement taken by the glass sheets through the cooling station 23. If necessary, a support wire (not shown) may be provided to one side of the glass to help retain a glass sheet in proper oblique orientation parallel to the position it occupies while traversing the cooling station 23.

The furnace 16 and the loading station 14 are supported on a furnace support frame 96. The latter rests on a series of cross base members 87 through cross beams 88 mounted in angular relation thereto through a series of pivots 89. The angular relation is maintained by lock nuts adjustably secured along the length of externally threaded adjustors interconnecting the cross beams 88 with the cross base members 87 in spaced relation to the pivots 89.

Similarly, the spaced plenum chambers 83 and 84 and the unloading station 24 are supported on a support frame 90 which comprises cross beams 92, similar to the cross beams 88 of the support structure for the furnace support frame 96. Cross beams 92 are pivotally attached to base members 94 through pivots 93 in a manner similar to the attachment of the cross beams 88 of the furnace support frame 96 to its base members 87 and are kept in a desired orientation by lock nuts fixed along the length of similarly supplied additional attachment members similar to those provided for the support frame 96 for the furnace.

Jack means may be used to change the orientation of the support frame 90. Similar jack means may be used to independently adjust the orientation of the furnace support frame 96. The jacks are usually adjusted so that the shaping molds 33 and 34 and the cooling plenum chambers 83 and 84 are oriented parallel to the orientation of the inner wall of the gas plenum chamber 50 and the opposing wall 60 of the furnace 16.

FIGS. 4 to 9 illustrate a succession of steps in a typical operating cycle of the present invention. Arrows illustrate the direction of movement of the molds 33 and 34, the lifting means 70 are pressurized air through flexible supply hoses 31 and 32 at various stages of the cycle.

Figure 4:
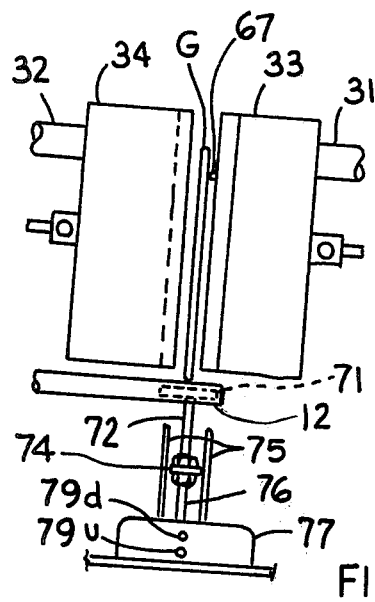
FIG. 4 is a cross-sectional view taken along the lines 4—4 of FIG. 3 showing a pair of shaping molds separated and said lifting means in said retracted position with the leading edge of a hot glass sheet entering between said separated molds.
Figure 5:
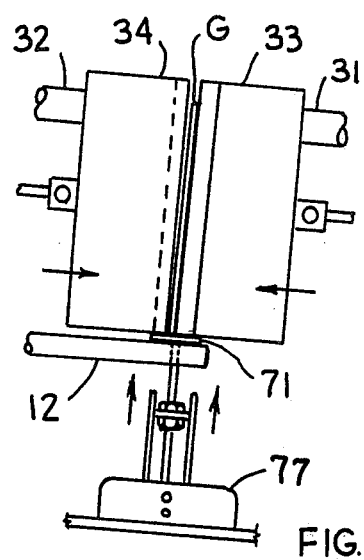
FIG. 5 is a view similar to FIG. 4, taken after the step shown in FIG. 4, when the glass sheet has fully entered the shaping station, the shaping molds have started to move toward one another and the lifting means has moved to a glass lifting position to lift the glass sheet above said bottom edge conveyor support means and into transverse alignment between said shaping molds.

Typical control devices in the form of limit switches and timing circuits of the type well known in the glass processing art are included in the apparatus, so that when a glass sheet G approaches the exit end 18 of the furnace 16 after having been heated to the glass deformation temperature, it is brought into a position between the press bending molds 33 and 34 while the latter are located in their retracted state as depicted in FIG. 4. The glass sheet is shown in FIG. 4 tilted obliquely at an angle of about 7 degrees to the vertical.

In FIG. 4 the glass sheet is shown entering the shaping station 20 with the shaping molds 33 and 34 retracted and the glass supported on the support rollers 67 in tilted relation toward the convex shaping mold 33. It is understood that the orientation of tilting may be toward the concave shaping mold 34 as well as toward the convex shaping mold 33 depending upon the desire of the operator. It is also possible to maintain the glass sheet supported in a vertical orientation, if desired. All these orientations are considered upright for the purposes of this specification.

The various control circuits and limit switches cause the solenoid valve 79 to be actuated to supply air in line 79u so as to lift the transverse fingers 71 in unison. The fingers move from their retracted position depicted in phantom in FIG. 4 to the elevated position depicted in FIG. 5 as the shaping molds 33 and 34 move toward one another but have not as yet engaged the opposite major surfaces of the glass sheet throughout their entire extent.

Figure 6:
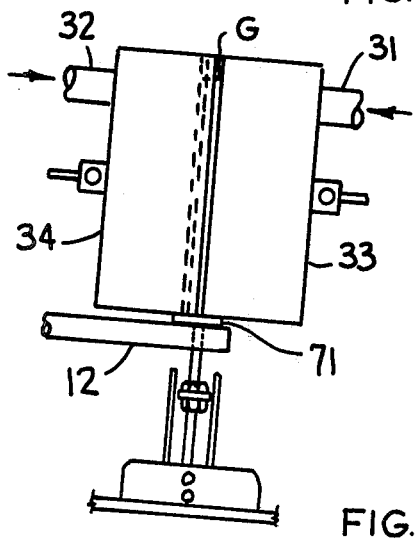
FIG. 6 is a view similar to FIGS. 4 and 5, taken after the step down in FIG. 5, showing the shaping molds in their fully closed position engaging the opposite major surfaces of the hot glass sheet to shape the latter while the lifting means continue to support the bottom edge of the hot glass sheet in alignment between said shaping molds.

In FIG. 6, the molds are depicted in the position they occupy after they have made complete engagement against the opposite surfaces of the glass sheet G to impress their shape thereon. At the same time, the transverse fingers 71 occupy an upward position where their upper surfaces engage the bottom surfaces of the shaping molds so that the bottom edge of the glass sheet is aligned with the bottom edge of the molds. Thus, the entire extent of the glass sheet, including its bottom edge, is maintained in rigid engagement between the shaping faces of the shaping molds 33 and 34 when the shaping molds close. The arrows in FIG. 6 depict air being supplied via hoses 31 and 32 to the chambers provided in each of the shaping molds 33 and 34. The air is supplied against the opposite major surfaces of the glass sheet through the apertures or holes 64 that are provided in the major surfaces of the molds 33 and 34 that face the major surfaces of the glass sheet. The horizontal channels 66 which contain the holes 64 provide paths of escape for excess air so as to avoid having the air stagnate against the glass and form dimples in the glass. Furthermore, the fiber glass covers 30 are of porous material so as to provide a film of air between the opposite major surfaces of the glass sheet being shaped and the mold covers 30.

Figure 7:
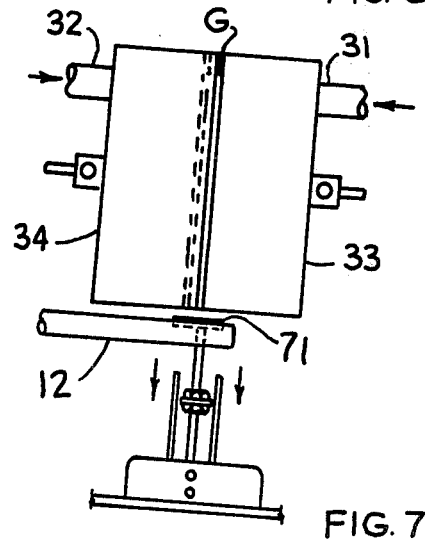
FIG. 7 is a view similar to FIGS. 4, 5 and 6, taken after the step shown in FIG. 6 with the shaping molds continuing to engage the opposite major surfaces of said shaped glass sheet while the lifting means is descending toward its retracted position.

As depicted in FIG. 7, the solenoid valve 79 is actuated to shift the air supply from line 79u to 79d. This causes transverse fingers 71 to begin to retract toward their recessed position as depicted by the downwardly extending arrows in FIG. 7. At the same time, the shaping molds 33 and 34 remain in their closed position and air is supplied through the holes 64 as in the stage of the shaping operation depicted in FIG. 6.

Figure 8:
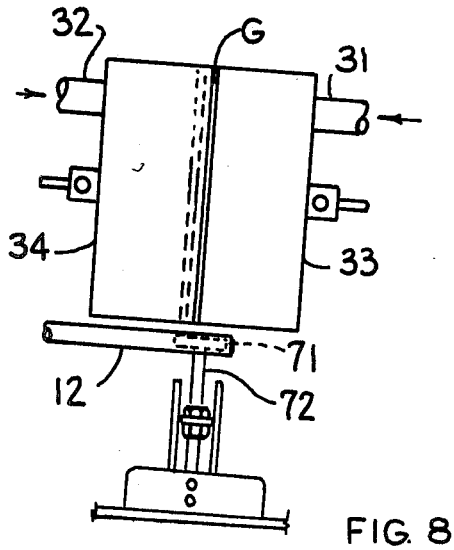
FIG. 8 is a view similar to FIGS. 4, 5, 6 and 7, taken after the step shown in FIG. 7, with the shaping molds continuing to engage the opposite major surfaces of said shaped glass sheet and said lifting means at its retracted position below said bottom edge conveyor support means.

In FIG. 8, the air controlled by solenoid valve 79 has been discharged through line 79d to retract transverse fingers 71 to their retracted position depicted in FIG. 8. The shaping molds 33 and 34 remain in their glass engaging position with air being supplied through flexible supply hoses 31 and 32 as in the previous two figures.

Figure 9:
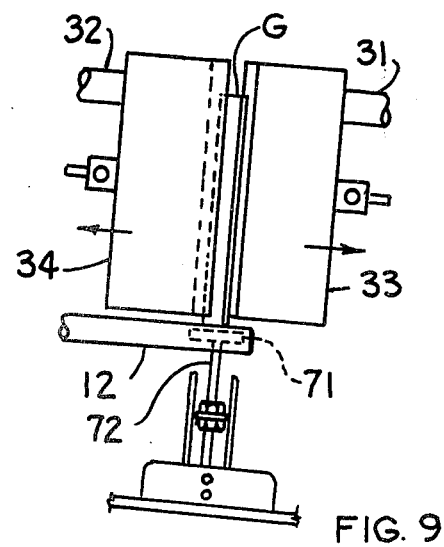
FIG. 9 is a view similar to FIGS. 4, 5, 6, 7 and 8, taken immediately after the step depicted in FIG. 8, showing the shaping molds separating and the shaped glass sheet lowered to a position where its bottom edge rests upon said bottom edge conveyor support means for conveyance into a cooling station.

In FIG. 9, the glass sheet has been shaped and the shaping molds 33 and 34 begin to retract. At this moment, the air supplied to the chambers forming part of the shaping molds 33 and 34 has been discontinued because there is no need for further air film between the glass sheet and the mold covers 30. The glass sheet G has been deposited on the conveyor rolls 12 and the latter rotate to transfer the glass into the cooling station 23. The support bar 68 helps to support the glass sheet as it is conveyed from the shaping station 20 to the cooling station 23 until such time as the blasts of tempering fluid supplied through the opposing arrays of nozzles 85 and 86 help balance the glass as it is conveyed through the cooling station 23.

The form of the invention shown and described in this specification represents an illustrative preferred embodiment thereof. It is understood that various changes may be made, such as providing aligned grooves in the bottom edge portions of the shaping molds to enable the bottom edge of the glass sheet to be lifted above the bottom edges of the molds, thereby insuring that the entire peripheral portion of said glass sheet is recessed within the peripheral portions of the shaping molds when the molds engage the glass sheet to shape the latter, without departing from the gist of the invention as defined in the claimed subject matter which follows.

I claim:

1. A method of shaping glass sheets comprising: heating a glass sheet in an upright position while the bottom edge of the glass sheet rests directly on first horizontally extending conveyor means;

conveying the glass sheet onto second horizontally extending conveyor means, which extends from the first conveyor means and is comprised of conveyor rolls, and into a shaping station, and stopping the glass sheet in the shaping station in an upright position with its bottom edge resting directly on the conveyor rolls and between a pair of opposed, complementary press bending molds spaced above the conveyor rolls a distance sufficient to provide clearance between the bottom edges of the bending molds and the tops of the conveyor rolls, each bending mold having a surface area at least equal to that of the glass sheet;

raising lifting fingers between the conveyor rolls into contact with the bottom edge of the glass sheet and raising the glass sheet on the lifting fingers to bring the bottom of the glass sheet to an elevation at least equal to the elevation of the bottom edges of the bending molds;

advancing the bending molds toward each other to engage the glass sheet on both sides throughout essentially the entire area of the glass sheet and to bend the glass sheet therebetween;

lowering the lifting fingers between the conveyor rolls and separating the bending molds, so that the bottom edge of the glass sheet again directly contacts the conveyor rolls; and conveying the glass sheet out of the shaping station.

2. The method of claim 1 wherein the lifting fingers raise the bottom edge of the glass sheet to an elevation above the elevation of the bottom edges of the bending molds, and the lifting fingers are received in grooves in the bottom portions of the bending molds when the bending moles engage the glass sheet.

3. The method of claim 1 wherein the glass sheet after being conveyed out of the bending station is brought into a cooling station where it is rapidly cooled to produce a temper in the glass.

4. An apparatus for shaping glass sheets by press bending comprising: a tunnel-type furnace, a shaping station, horizontally extending conveyor means for conveying a series of glass sheets in an upright position through the furnace and the shaping station, the portion of the conveyor means in the shaping station comprising conveyor rolls adapted to directly support the bottom edge of each glass sheet, a pair of glass shaping molds having opposed, complementary shaping surfaces, the bottom edges of the shaping molds being spaced above the tops of the conveyor rolls in the shaping station a distance sufficient to provide clearance therebetween, means to horizontally reciprocate the shaping molds so as to press bend an upright glass sheet received therebetween, a plurality of lifting fingers located between conveyor rolls beneath the shaping molds and adapted to engage the bottom edge of a glass sheet, means for vertically reciprocating the lifting fingers between a retracted position below the line of support of the bottom edge of a glass sheet on the conveyor rolls and a raised position in which the uppermost extent of the lifting fingers is at least equal to the elevation of the lower edge of the shaping molds, whereby essentially the entire area of each glass sheet may be engaged by the shaping surfaces of the shaping molds.

5. The apparatus of claim 4 wherein the bottom edge portions of the shaping molds include grooves within which the lifting fingers may be received while in their raised position, whereby the bottom edge of each glass sheet may be raised above the bottom edge of the shaping molds.

6. The apparatus of claim 4 wherein said lifting fingers comprise vertically elongated members, each of which is affixed at its lower end below the conveyor rolls to a common cross bar, the cross bar being connected to a vertically acting reciprocating means.

* * * * *